Patented May 16, 1944

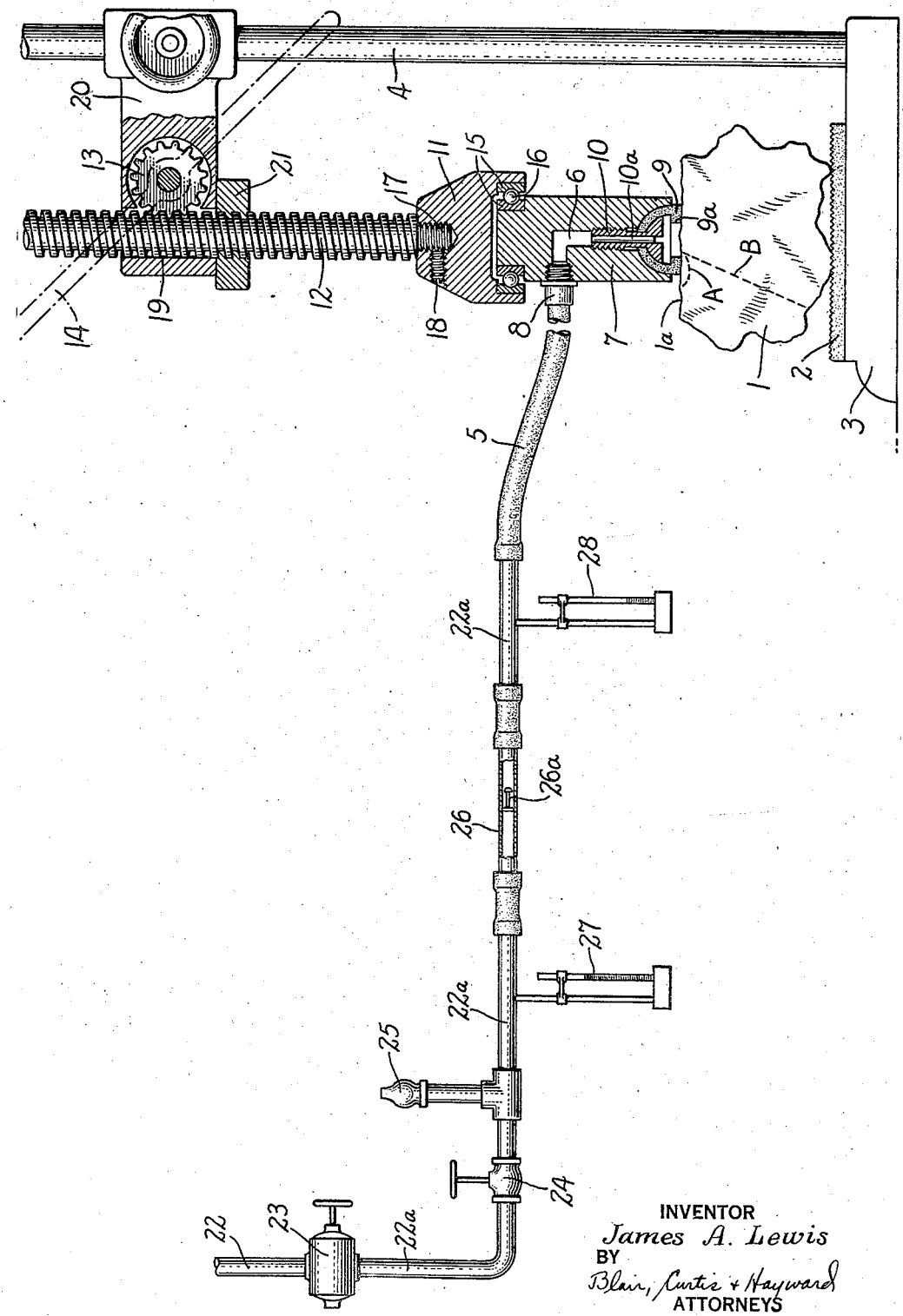

2,348,985

UNITED STATES PATENT OFFICE 2,348,985

METHOD FOR DETERMINING PERMEABILITY

James A. Lewis, Dallas, Tex., assignor to Core Laboratories, Inc., Dallas, Tex., a corporation of Delaware Application April 19, 1940, Serial No. 330,496

4 Claims. (Cl. 73—51)

This invention relates to a method for determining the permeability of permeable materials such as of cores obtained during coring operations in the drilling of oil wells.

In drilling an oil well, it is common practice to take core samples of the sands through which the well is being drilled whenever it is desirable to obtain analyses of such sands. When analyses of the sands are used to determine at what horizon the well is to be "set" to produce, or are used to determine whether or not the drilling is to be continued, it is important that the analyses be made rapidly. One of the properties of the core sample which has to be determined is permeability. Methods and apparatus which have been heretofore used for determining the permeability of a core sample have the disadvantages of requiring time-consuming operations such as preforming and shaping the core to exact cylindrical dimensions, measuring the volume of the sample, extracting oil and water from the sample, and mounting the sample in a fluid-tight mounting.

The present invention provides a rapid and accurate method for determining the permeability of unshaped and unmeasured samples.

Permeability is that property of a solid which makes possible the transport or conveyance of fluids by and through it; in other words, it is a measure of the fluid conductivity of a solid. Hence the most direct method of measuring the permeability of a solid comprises passing a fluid therethrough under certain standardized conditions and measuring the rate of flow of the fluid. The present invention provides an improved method and apparatus for determining the permeability of core samples in this way.

Apparatus capable of carrying out the method of the present invention is shown in the accompanying drawing.

Referring to the drawing, and more particularly to the right-hand portion of the drawing where parts of the apparatus are shown in section, a fluid such as air is supplied through a flexible connecting tube 5 to a contact head 7 adapted to make an air-tight contact with a plane surface 1a of a relatively large core sample 1 so that all air flowing through the head flows into the sample. The significance of the term "relatively large" will be explained below.

Referring now to the left-hand side of the drawing, the air supplied to the sample comes from a supply pipe 22. The flow of air from the supply pipe 22 is controlled by a conventional pressure reducing valve 23 which serves to maintain a constant downstream pressure in line 22a. A shut-off valve 24 and safety valve 25 are also provided.

The rate of flow of air to the head 7 is measured by causing the air to flow through an orifice 26a in a coupling 26 in the line 22a. The pressure before and after the orifice is measured by means of manometers 27 and 28. Orifice 26a is carefully calibrated to determine the quantity of air which will flow therethrough for different differential pressures when the pressure indicated by manometer 27 is maintained constant by means of the reducing valve 23. After passing through the orifice 26a, air flows to the sample 1 through the flexible tube 5 and head 7 as described above. Since the pressure reducing valve 23 maintains a constant pressure in the line 22a, the pressure indicated by the manometer 27 will be constant, and hence the pressure indicated by the manometer 28 will be a measure of the rate of flow of fluid into the core sample 1.

The sample 1 rests on a yielding rubber mat 2 having an irregular upper surface and supported on the base 3 of a suitable standard 4. The contact head 7 is provided with an L-shaped internal bore 6, the horizontal portion of which is tapped to receive a threaded connector 8 which serves to make an air-tight connection between the flexible tube 5 and head 7. At its lower end, the bore 6 widens out to form a hemispherical surface which is adapted to receive a stiff moulded rubber sealing cup 9, also generally hemispherical in shape. The vertical section of the bore 6 is tapped to receive a screw 10 which serves to retain the moulded rubber cup 9 in place. Screw 10 is provided with a vertical bore 10a to permit passage of fluid therethrough. The cup 9, as shown in the drawing, extends somewhat below the lower surface of head 7 and is provided with an internal lip 9a to ensure an air-tight seal between the head and sample surface 1a.

Mechanism for pressing the head 7 against the sample 1 is shown comprising a cap 11 connected to a shaft 12 which cooperates with a spur gear 13 rotated by a handle 14. The cap 11 and the head 7 are provided with the races 15 which receive the bearings 16 to facilitate relative rotation of the cap and head. The cap 11 is tapped to receive the threaded end 17 of rod 12, a set screw 18 being provided to secure the threaded end 17 to the cap 11. The rod 12 passes through and is guided by a hole 19 in the arm 20 of the stand 4. The rod 12 may be raised or lowered either by direct manual operation or by turning spur gear 13 by means of handle 14. When the height of the rod has been adjusted to give the desired pressure on the sample 1, a lock nut 21 is rotated until it comes into contact with the arm 20 and prevents upward movement of rod 21.

As pointed out above, a relatively large core sample 1 is preferably used and the significance of the term "relatively large" will now be explained.

Fluid entering the sample at the surface 1a may pass through the sample to the atmosphere by an infinite number of paths, including the paths indicated in the drawing as A and B. It is apparent that as the size of the sample is increased, the length of path B, for example, will increase, whereas the length of path A will remain substantially constant. Assuming the sample to be homogeneous, the resistance to flow of fluid along the path B will likewise increase with increasing sample size and hence a lesser proportion of the fluid entering the surface 1a will follow a path such as B and a greater proportion of the fluid will follow a path such as A.

As the size of the sample is increased, a point will be reached such that the sample may, for practical purposes, be considered as semi-infinite, that is, substantially all of the fluid entering the surface 1a will leave the sample through the same surface by a path such as path A. When both the vertical and horizontal dimensions of the sample are greater than three or four times the maximum diameter of the fluid inlet, all of the entering fluid may, in most cases, as a practical matter, be considered as leaving the sample through the surface 1a at which it enters. The term "relatively large sample" as used in this application means a sample having horizontal and vertical dimensions such that the proportion of fluid leaving the sample through the same surface at which it enters is sufficiently large to permit computation of permeability in the manner described below to give reasonably accurate results. When a sample having dimensions greater than these minimum values is used, the actual dimensions of the sample as well as variations in the contour of all surfaces except 1a of the sample are immaterial. Hence, by using the method of the present invention, the tedious and time-consuming operation of pre-shaping the sample is unnecessary and the sample need not be mounted in a fluid-tight mounting.

The permeability of the sample 1 may be computed from the reading of the manometer 28 by using D'Arcy's law. According to this law, the rate of flow of a fluid through a porous solid is proportional to the fluid pressure gradient. The constant of proportionality depends upon the permeability and if the pressure gradient and flow are expressed in proper units, the pressure drop through the sample is numerically equal to permeability. Hence it is possible by properly evaluating the pressure gradient and flow through the sample to compute the permeability of the sample.

D'Arcy's law may be conveniently formulated as follows:

$$k = \frac{QL}{AP}$$

wherein $k$ is the permeability;
$Q$ is the rate of flow of fluid;
$L$ is the length of the mean fluid path;
$A$ is the mean area of the fluid path; and
$P$ is the pressure drop through the sample.

The rate of flow of fluid, $Q$, through the sample may be obtained by using the conventional flow formula and computing flow from the pressure difference across orifice 26a. The manometer 28 measures the difference between atmospheric pressure and the pressure in the line 22a downstream of the orifice and hence effectively measures the pressure drop P through the sample. The ratio L/A is automatically maintained at an approximately constant value by the use of a relatively large sample, as described above. This ratio may be empirically determined by using a sample of known permeability and once determined is the same for all samples tested. These values of rate of flow of fluid Q, pressure drop P, and the ratio L/A as thus determined may then be substituted in the D'Arcy equation given above to obtain the value of the permeability of a sample being tested.

Further, when the pressure reducing valve 23 is set to always maintain the same pressure in the line 22a upstream of the orifice, the pressure in the line 22a between the sample and orifice and the reading of manometer 28 become an indication of both the flow Q through the orifice and the pressure drop P across the sample. Hence the manometer 28 may be calibrated to read directly in terms of permeability and thus the permeability of a sample can be determined from a single reading.

The sample 1 sometimes contains oil or water or both and hence it is desirable in some cases to permit air to flow through the sample for a period of time to remove this oil and water before the manometer 28 is read. The pressure indicated by the manometer 28 gradually drops as the oil and water are blown out and finally assumes a constant value at which time its reading is recorded. The blowing out of the oil and water may be hastened by passing air through the sample at a relatively high velocity for a period of time and then lowering the air velocity to a point where the permeability can be measured.

Under certain circumstances when, for example, the oil in the sample is exceptionally heavy, it may be desirable to force a quantity of an oil solvent under pressure through the sample in order to facilitate the removal of the oil, or it may be desirable to force a water solvent such as acetone through the sample to remove water. The solvent may then be evaporated by passing air through the sample. Ordinarily, however, it will be unnecessary to flush the sample with liquid solvent.

Thus it is apparent that the present invention provides a rapid method of measuring the permeability of samples of permeable materials and apparatus capable of carrying out the method. As pointed out above, the permeability can be determined from a single reading, and it is unnecessary that the sample be carefully pre-shaped and mounted in a fluid-tight mounting. Furthermore, the flow of fluid through the sample is a combination of vertical and lateral flow rather than linear flow and hence more closely approximates actual flow through the various strata of oil-bearing sands.

Since many embodiments might be made of the above invention, and since many changes might be made in the embodiment here disclosed, it is to be understood that all matter hereinbefore set forth is to be interpreted as illustrative only and not in a limiting sense.

I claim:

1. The method of measuring the permeability of a permeable porous material comprising the steps of supplying fluid under pressure to a predetermined restricted area of an approximately plane unrestricted surface of a sample of said material, said sample being sufficiently large with respect to said predetermined area that substantially all of the fluid entering said surface leaves said sample through the same surface at which it enters said sample but outside said restricted area whereby accurate preshaping of said sample and mounting of said sample in a fluid-tight mounting is rendered unnecessary, measuring the flow of fluid to said sample, measuring the fluid pressure of the fluid entering said surface of said sample, and correlating said two measurements to obtain the value of the permeability of said sample.

2. Method of measuring the permeability of a permeable sand comprising the steps of supplying air under pressure to a predetermined restricted area of an approximately plane surface of a core sample of said sand selected for dimensions such that substantially all of the air entering said surface of said core sample leaves said sample through the same surface that it enters said sample but outside restricted area whereby accurate preshaping of said sample and mounting of said sample in a fluid-tight mounting is rendered unnecessary, measuring the flow of air to said sample, measuring the drop in air pressure through said sample, and correlating said measurements to determine the permeability of said sample.

3. The method of measuring the permeability of a permeable sand by utilizing the law that the rate of flow of fluid through a porous solid is proportional to the fluid pressure gradient through said solid, comprising the steps of supplying fluid under pressure to a predetermined restricted area of a plane surface of a core sample of said sand selected for dimensions such that the ratio of the mean lengths of the paths of fluid flow through the sample to the mean area of the fluid paths through the sample equals an empirically constant value which does not vary with said dimensions, whereby accurate preshaping of said sample and mounting of said sample in a fluid-tight mounting is rendered unnecessary, measuring the flow of fluid to the sample, measuring the fluid pressure drop across said sample and correlating said measurements to determine the permeability of said sample.

4. The method of measuring the permeability of a core sample by measuring with an orifice the flow of a fluid to and through said sample, comprising the steps of supplying fluid under pressure to a restricted area of a plane surface of a relatively large sample of said core, said sample being sufficiently large with respect to said restricted area that substantially all of the fluid entering said surface leaves said sample through the same surface at which it enters said sample but outside said restricted area, whereby accurate preshaping of said sample and mounting of said sample in a fluid-tight mounting is rendered unnecessary, maintaining a constant pressure upstream of said orifice, measuring the flow of fluid through said orifice, measuring the fluid pressure between said orifice and said sample and correlating said two measurements to obtain the value of the permeability of said sample.

JAMES A. LEWIS.